(12) United States Patent
Cadalso (10) Patent No.: US 10,823,255 B2
(45) Date of Patent: Nov. 3, 2020

(54) BALANCING SYSTEM FOR A ROTATING MEMBER

(71) Applicant: Daniel Cadalso, Albany, NY (US)

(72) Inventor: Daniel Cadalso, Albany, NY (US)

( * ) Notice: Subject to any disclaimer, the term of this patent is extended or adjusted under 35 U.S.C. 154(b) by 359 days.

(21) Appl. No.: 15/937,490

(22) Filed: Mar. 27, 2018

(65) Prior Publication Data

US 2019/0301564 A1    Oct. 3, 2019

(51) Int. Cl.
*F16F 15/14*     (2006.01)
*F01D 5/02*     (2006.01)

(52) U.S. Cl.
CPC .......... *F16F 15/1485* (2013.01); *F01D 5/027* (2013.01); *Y10T 464/40* (2015.01); *Y10T 464/50* (2015.01)

(58) Field of Classification Search
CPC ..... F16F 15/1485; F16F 15/363; F01D 5/027; Y10T 464/40; Y10T 464/50
USPC .............................. 464/127, 180; 73/66, 470
See application file for complete search history.

(56) References Cited

U.S. PATENT DOCUMENTS

| | | | |
|---|---|---|---|
| 3,109,684 A | 11/1963 | Tupper | |
| 3,294,456 A | 12/1966 | Williams et al. | |
| 3,733,923 A * | 5/1973 | Goodrich | F16F 15/363 464/180 |
| 4,059,972 A | 11/1977 | Beam, Jr. et al. | |
| 4,060,009 A * | 11/1977 | Wyman | G01M 1/36 464/180 |
| 4,522,271 A * | 6/1985 | Bodine | E21B 17/16 |
| 5,195,930 A * | 3/1993 | Hirano | B60K 17/22 464/180 |
| 6,267,450 B1 | 7/2001 | Gamble | |
| 6,715,566 B2 | 4/2004 | Wallace | |
| 6,826,817 B1 | 12/2004 | Rapp | |
| 7,137,897 B2 | 11/2006 | Kehrer | |
| 7,360,846 B2 * | 4/2008 | Krueger | F16F 15/363 |
| 8,939,123 B2 | 1/2015 | Herzog et al. | |
| 8,966,752 B2 | 3/2015 | Vogel et al. | |
| 2006/0225284 A1 | 10/2006 | Byerly et al. | |
| 2015/0167492 A1 | 6/2015 | Collette et al. | |

(Continued)

FOREIGN PATENT DOCUMENTS

DE     102008020852 A1    10/2009

OTHER PUBLICATIONS

Esterdahl, T., "Bead Balancing for Tires—What it is and Do They Really Work", (2014). http://www.tundraheadquarters.com/blog/bead-balancing-tires/.

(Continued)

*Primary Examiner* — Greg Binda
(74) *Attorney, Agent, or Firm* — Heslin Rothenberg Farley & Mesiti P.C.; Stephen P. Scuderi (57) ABSTRACT

A balancing system for a rotating member is presented. The rotating member includes a hollow portion and an axis of rotation which extends through the hollow portion. The balancing system includes a vessel that is insertable into the hollow portion of the rotating member. The vessel includes an outer shell which is shaped to conform to inner walls of the hollow portion. A plurality of solid balancing beads partially fill the vessel. When the vessel is inserted into hollow portion and the rotating member is rotating, the axis of rotation passes through the vessel and the balancing beads are centrifugally positioned within the vessel to compensate for imbalance in the rotating member.

20 Claims, 8 Drawing Sheets

(56) References Cited

U.S. PATENT DOCUMENTS

2015/0267773 A1    9/2015  Corbett et al.
2017/0259631 A1*   9/2017  Lesesky .............. B60C 23/0498

OTHER PUBLICATIONS

Shelton, C., "Causes of Shakes, Wobbles, and Shimmies and (Hopefully) Their Cures", Hot Rod Network, (2014). http://www.hotrod.com/articles/the-common-causes-of-shakes-wobbles-shimmies-and-cures/.

* cited by examiner

BALANCING SYSTEM FOR A ROTATING MEMBER

TECHNICAL FIELD

The present invention relates to balancing systems for rotary members and methods of making the same. More specifically, the invention relates to balancing systems having a vessel that is partially filled with balancing beads and inserted into a hollow portion of the rotary member.

BACKGROUND

Rotating members of rotating devices (such as a rotating drive shaft of a drive train, a rotating pump shaft of a pump, the rotating shaft of a motor or the rotating crankshaft of an internal combustion engine) may become increasingly imbalanced over time. The imbalance may be due to wear on the rotating member or on various portions of the rotating device.

The imbalance can also be caused by foreign objects adhering to the rotating member or rotating device. For example, an imbalance may occur in a pump shaft for a pump of a well bore drilling assembly if mud or other objects stick to the drill bit or other components of the drilling assembly.

Additionally, the balanced state of a rotating member may change over time. For example, wear of a drive shaft and other drive train components may continuously increase an imbalance of the drive shaft.

Accordingly, there is a need for a balancing system for a rotating member of a rotating device that can compensate for imbalance in the rotary member. There is also a need for a balancing system that can continuously compensate for changes in an imbalanced condition of the rotating member. Additionally, there is a need for a balancing system for a rotating member of a rotating device that can realign the center of mass of the rotating member more closely with the axis of rotation as the geometric shape of the rotating device changes over time.

BRIEF DESCRIPTION

The present invention offers advantages and alternatives over the prior art by providing a balancing system for a rotating member that compensates for imbalance in the rotary member. In one aspect of the present invention, the balancing system can dynamically compensate for changes in mass of the rotary member to keep the rotary member in balance while in motion.

A balancing system for a rotating member, wherein the balancing system is in accordance with one or more aspects of the present invention, is presented. The rotating member includes a hollow portion and an axis of rotation which extends through the hollow portion. The balancing system includes a vessel that is insertable into the hollow portion of the rotating member. The vessel includes an outer shell which is shaped to conform to inner walls of the hollow portion. A plurality of solid balancing beads partially fill the vessel. When the vessel is inserted into the hollow portion and the rotating member is rotating, the axis of rotation passes through the vessel and the balancing beads are centrifugally positioned within the vessel to compensate for imbalance in the rotating member.

A shaft balancing system for a rotating shaft of a rotating device, wherein the shaft balancing system is also in accordance with one or more aspects of the present invention, is presented. The shaft has a pair of hollow portions disposed on opposing ends of the shaft and an axis of rotation which extends through the hollow portions. The balancing system includes a pair of vessels that are insertable into a hollow portion of the pair of hollow portions. Each vessel of the pair of vessels includes an outer shell, which is shaped to conform to inner walls of the hollow portion it is inserted into. A plurality of solid balancing beads partially fill each vessel. When a vessel of the pair of vessels is inserted into each hollow portion of the pair of hollow portions and the shaft is rotating, the axis of rotation passes through each vessel and the balancing beads are centrifugally positioned within each vessel to compensate for imbalance in the shaft.

A method of balancing a rotating member of a rotating device, wherein the method is also in accordance with one or more aspects of the present invention, is presented. The method includes forming a hollow portion in the rotating member such that an axis of rotation of the rotating member extends through the hollow portion. A vessel is provided that is sized to be insertable into the hollow portion of the rotating member. The vessel includes an outer shell, which is shaped to conform to inner walls of the hollow portion. The vessel is partially filled with balancing beads. The vessel is inserted into the hollow portion of the rotating member such that the axis of rotation passes through the vessel. The vessel is conformed to the inner walls of the hollow portion in a friction fit. The rotating member is rotated. The balancing beads are centrifugally positioned within the vessel to compensate for imbalance in the rotating member.

DRAWINGS

The invention will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment maybe combined with the features of other embodiments. Such modifications and variations are intended to be included within the scope of the present invention.

The terms "substantially", "approximately", "about", "relatively" or other such similar terms that may be used throughout this disclosure, including the claims, are used to describe and account for small fluctuations, such as due to variations in processing. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

FIGS. 1A-7B illustrate various exemplary embodiments of a balancing system in accordance with aspects described herein. FIG. 8 illustrates a flow diagram of an exemplary embodiment of a method of making the balancing system in accordance with aspects described herein.

Figure 1A:
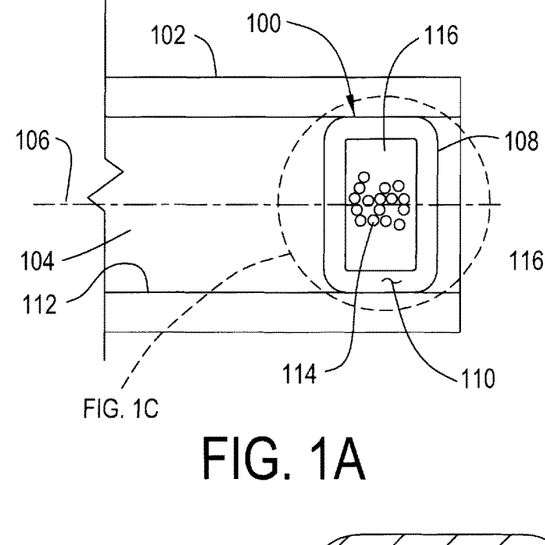
FIG. 1A is an exemplary embodiment of a cross sectional side view of a balancing system disposed in a hollow portion of a rotating member in accordance with aspects described herein.
Figure 1B:
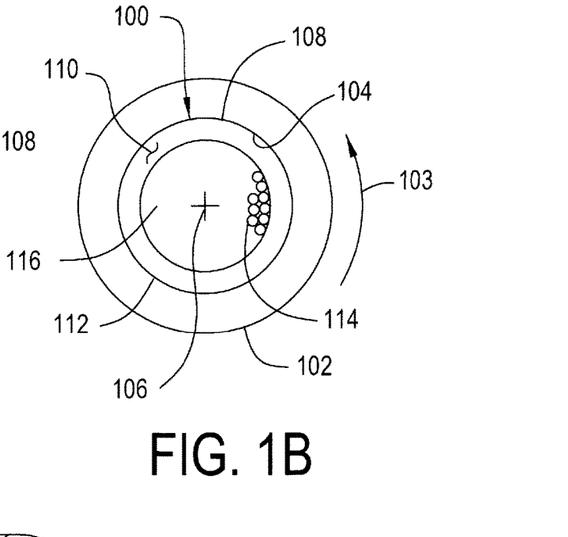
FIG. 1B is an exemplary embodiment of a cross sectional end view of the balancing system of FIG. 1A in accordance with aspects described herein.
Figure 1C:
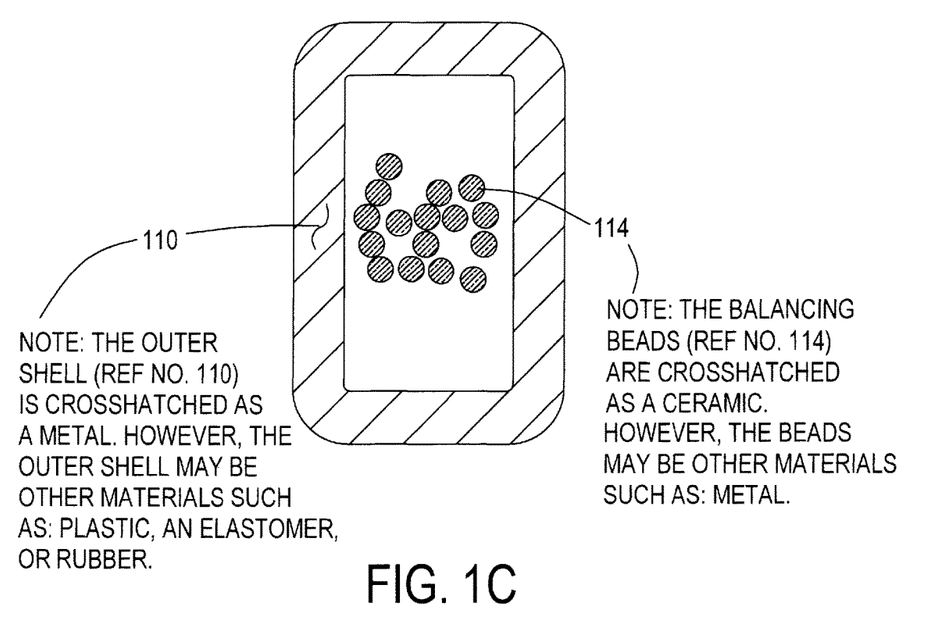
FIG. 1C is an exemplary embodiment of an enlarged cross sectional side view of circle 1C of FIG. 1A in accordance with aspects described herein.

Referring to FIGS. 1A and 1B, an exemplary embodiment of a cross sectional side view (FIG. 1A) and a cross sectional end view (FIG. 1B) of a balancing system 100 disposed in a rotating member 102, in accordance with aspects described herein, is presented. Referring also to FIG. 1C, an exemplary embodiment of a cross sectional end view of circle 1C of FIG. 1A, in accordance with aspects described herein, is presented. The rotating member 102 includes a hollow portion 104 and an axis of rotation 106 which extends through the hollow portion 104.

Figures 5A, 5B:
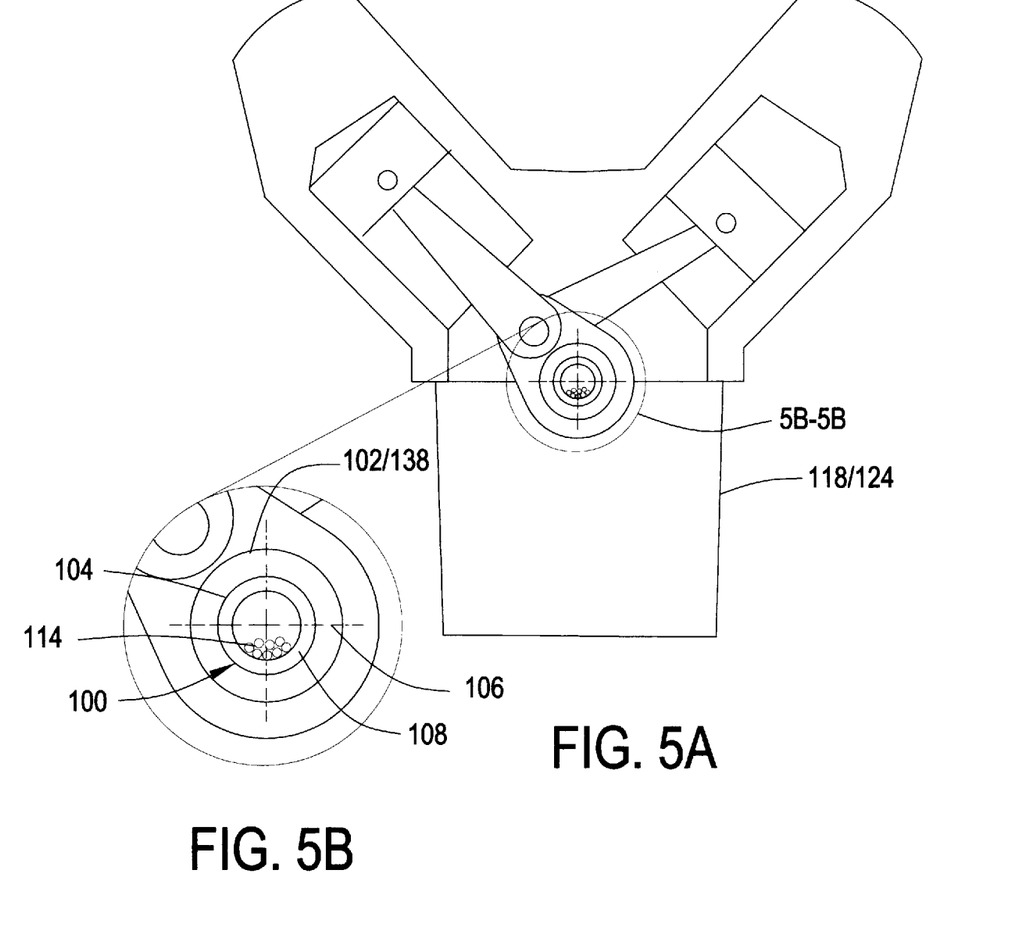
FIG. 5A is an exemplary embodiment of a cross sectional end view of a balancing system disposed in a hollow portion of a crank shaft for an internal combustion engine in accordance with aspects described herein.
FIG. 5B is an exemplary embodiment of an enlarged cross sectional view of the circular area 5B-5B in FIG. 5A in accordance with aspects herein.
Figure 6:
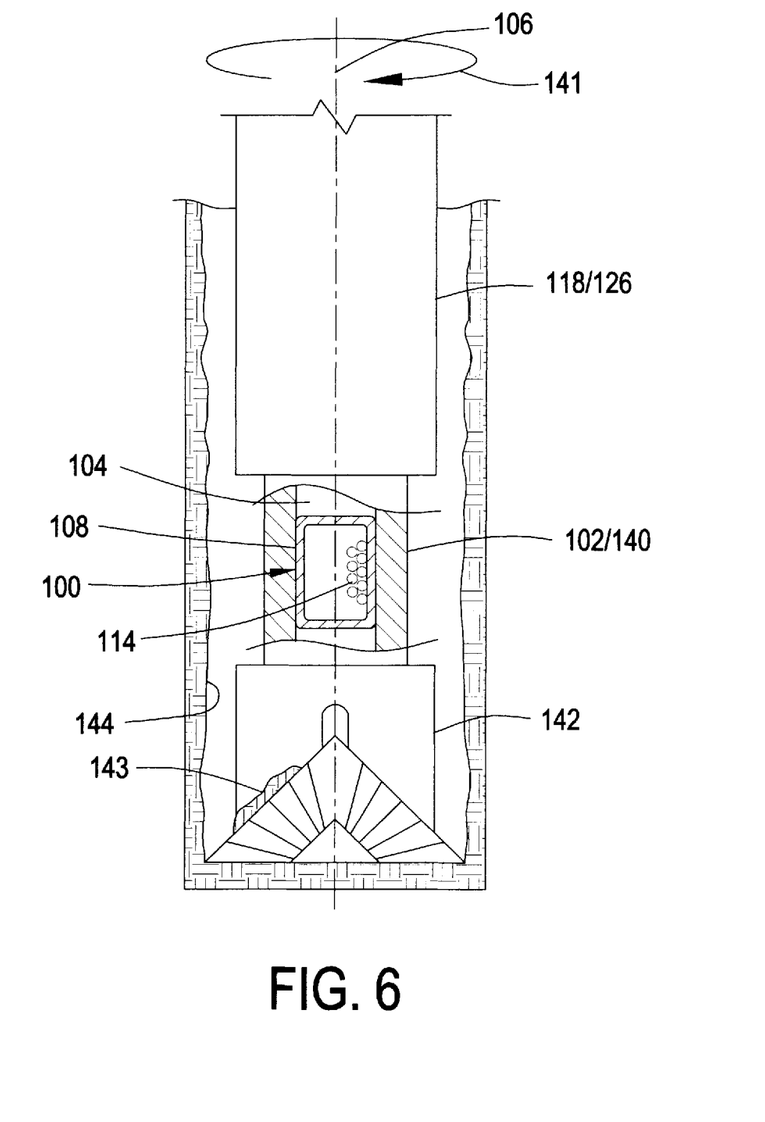
FIG. 6 is an exemplary embodiment of a cross sectional view of a balancing system disposed in a hollow portion of a pump shaft for a pump of a well bore drilling assembly in accordance with aspects described herein.

The rotating member 102, in this specific embodiment, is a rigid shaft 102 that is rotated (as indicated by directional rotation arrow 103) by a rotating device 118 (best seen in FIGS. 3-6), such as a drive train 202 (best seen in FIG. 3A), a motor 122 (best seen in FIG. 4A), an engine 124 (best seen in FIG. 5A) or a pump 126 (best seen in FIG. 6). The hollow portion 104 of the shaft 102 is illustrated as extending through its entire length. However, in other embodiments, the hollow portion 104 may only extend far enough to receive the balancing system 100 within the interior of the shaft 102.

The balancing system 100 includes a vessel 108, which is sized to be insertable into the hollow portion 104 of the rotating member 102. The vessel 108 includes an outer shell 110, which is shaped to conform to inner walls 112 of the hollow portion 104.

The outer shell 110 of the vessel 108 may be composed of a rigid material, such as a steel or a rigid plastic, that is sized to frictionally fit against the inner walls 112 of the hollow portion 104. Alternatively the outer shell 110 may include one or more "O-rings" to provide O-ring seals against the inner walls 112 of the hollow portion 104. Alternatively, the outer shell 110 may be composed of a deformable substance, such as a malleable plastic or an elastomer, such that the shape of the outer shell 110 changes to closely conform to, and frictionally fit with, the shape of the inner walls 112 when the vessel 108 is inserted into the hollow portion 104. For example, the outer shell 110 may be a type of rubber. By way of another example, the outer shell 110 may be composed of a malleable metal, such as lead, tin or aluminum.

In this specific embodiment, the hollow portion 104 is concentrically disposed around the axis of rotation 106. Also, the vessel 108 of the balancing system 100 is sized to frictionally fit into the hollow portion 104. That is, the outer shell 110 of the vessel 108 abuts against the inner walls 112 of the hollow portion 104 such that the rotating member 102 and balancing system 100 rotate together.

A plurality of solid balancing beads 114 partially fill the hollow interior 116 of the vessel 108. The solid balancing beads 114 may be made of any appropriate material that will not substantially wear or deform with use. For example, the balancing beads may be made of metal or ceramic.

When the vessel 108 is inserted into the hollow portion 104 and the rotating member 102 is rotating, the axis of rotation 106 passes through the vessel 108 and the balancing beads 114 are centrifugally positioned within the vessel 108 to compensate for imbalance in the rotating member 102. More specifically, the beads 114 will move under the influence of the centrifugal force applied by the rotating member 102. The centrifugal force will tend to distribute the beads 114 such that their mass will tend to offset any shifts (imbalance) in the center of mass of the rotating device caused by, for example, wear on the rotating device or foreign objects adhering to the rotating device. The distribution of the beads 114 will tend to realign the center of mass with the axis of rotation 106 of the rotating member 102, and therefore, reduce undesirable vibrations caused by such imbalance.

Figure 2A:
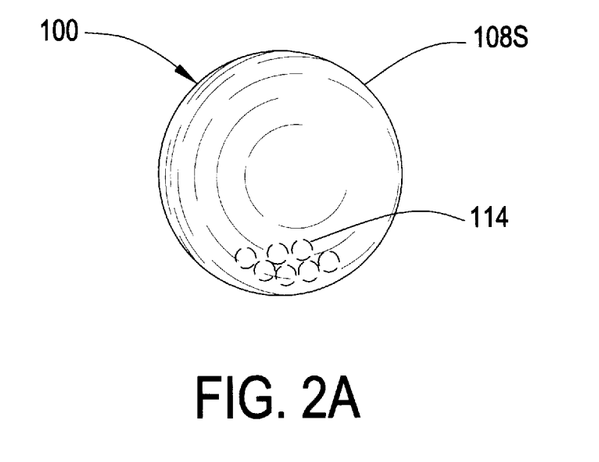
FIG. 2A is an exemplary embodiment of a perspective view of a spherically shaped vessel of a balancing system in accordance with aspects described herein.
Figure 2B:
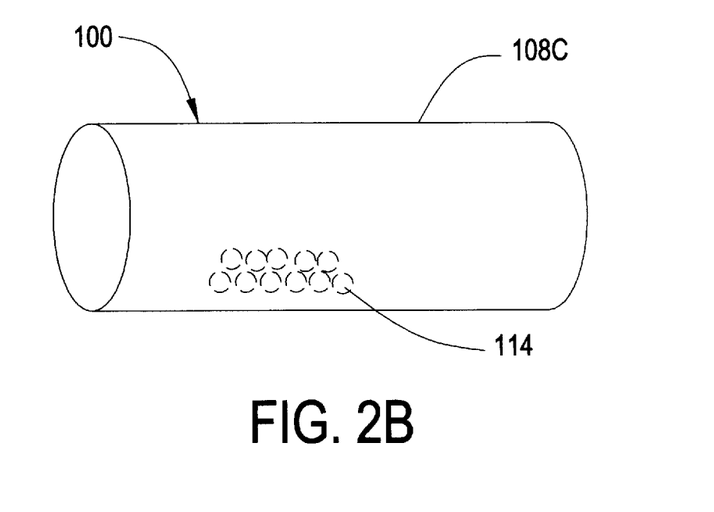
FIG. 2B is an exemplary embodiment of a perspective view of a cylindrically shaped vessel of a balancing system in accordance with aspects described herein.

Referring to FIGS. 2A and 2B, an exemplary embodiment of a perspective view of a spherically shaped vessel 108S (FIG. 2A) and a cylindrically shaped vessel 108C (FIG. 2B) of a balancing system 100, in accordance with aspects described herein, is presented. The vessel 108 may be formed in a variety of shapes prior to being inserted into the hollow portion 104 of the rotating member 102. For example, as shown in FIGS. 2A and 2B, the vessel 108 maybe a substantially spherical shaped vessel 108S, a substantially cylindrical shaped vessel 108C or a vessel 108 having other appropriate shapes prior to being inserted into the hollow portion 104 of the rotating member 102.

If the vessel 108 is composed of a rigid material, such as steel or a rigid plastic, the shape of the vessel 108 may not change substantially upon insertion into the hollow portion 104. Alternatively, if the vessel 108 is composed of a deformable material, such as an elastomer, the shape of the vessel 108 may change significantly as the vessel 108 conforms to the shape of the inner walls 112 of the hollow portion 104. For example, the spherical shaped vessel 108S of FIG. 2A may change to a more cylindrical shape, which more closely resembles the vessel 108C of FIG. 2B, if it were composed of an elastomer and inserted into a cylindrically shaped hollow portion 104.

By containing the balancing beads 114 within the vessel 108, the balancing system 100 prevents the balancing beads 114 from randomly migrating along the entire length of the hollow portion 104 of a rotating member 102 during operation. As such, the contained balancing beads 114 can be selectively located in that portion of any rotating member 102 where their combined mass can most effectively offset vibrations due to imbalance in the rotating member 102.

Additionally, the self-contained nature of the balancing system 100 provides a modular aspect to the system 100, wherein a single sized balancing system 100 can be used to balance a variety of rotating members 102 for a variety of applications. Moreover, if the vessel 108 of the balancing system 100 is composed of a deformable material, then a single sized balancing system 100 may also frictionally fit a variety of sizes of hollow portions 104 within a variety of rotating members 102.

Figure 3A:
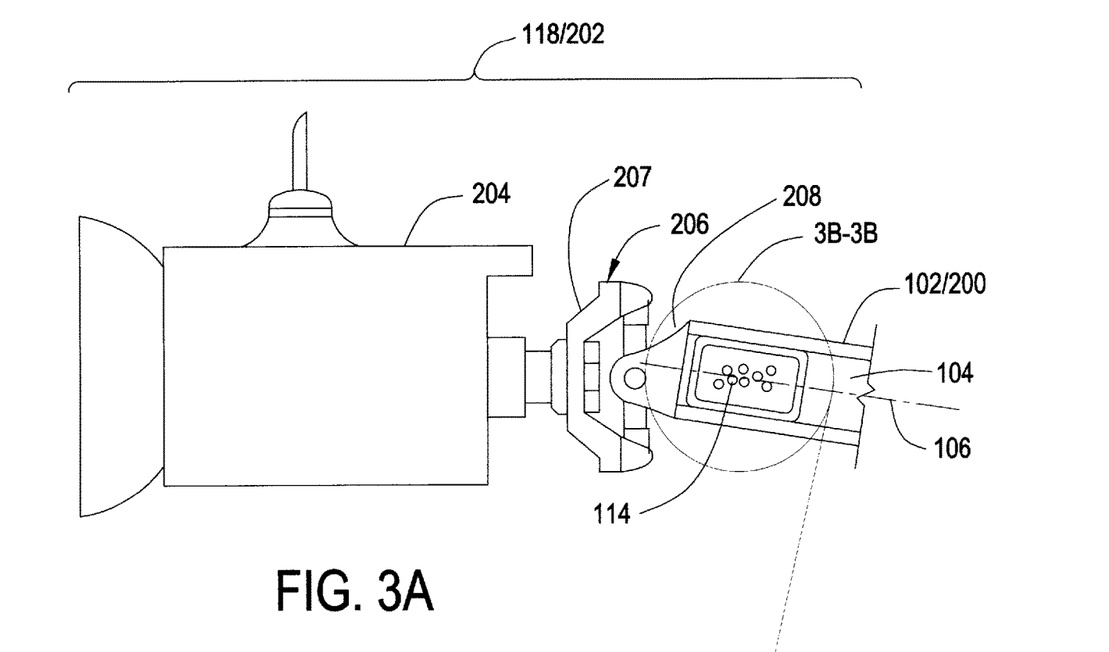
FIG. 3A is an exemplary embodiment of a cross sectional side view of a balancing system disposed in a hollow portion of a drive shaft for a drive train in accordance with aspects described herein.
Figure 3B:
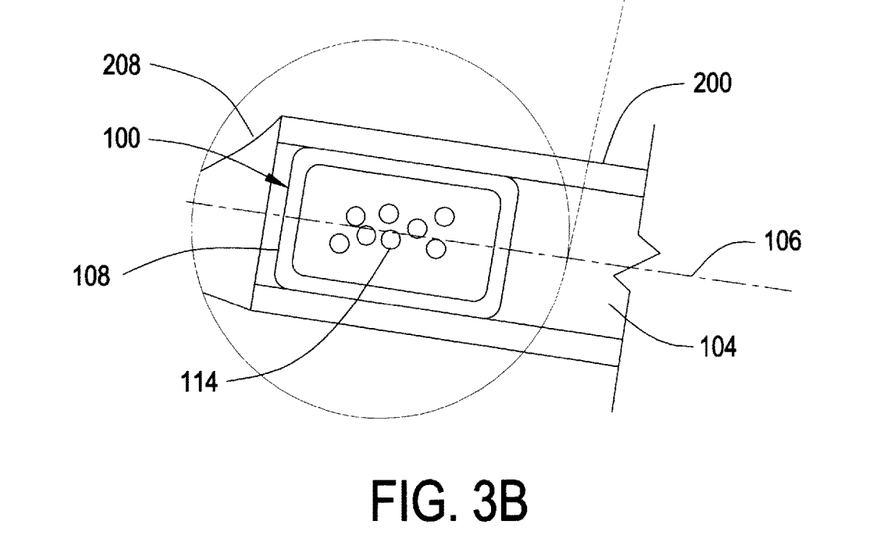
FIG. 3B is an exemplary embodiment of an enlarged cross sectional side view of the circular area 3B-3B in FIG. 3A in accordance with aspects herein.

Referring to FIGS. 3A and 3B, wherein FIG. 3A is another exemplary embodiment of a cross sectional side view of balancing system 100 disposed in a rotating member 102 of a rotating device 118 and FIG. 3B is an exemplary embodiment of an enlarged cross sectional view of the circular area 3B-3B in FIG. 3A. More specifically, in this embodiment, the rotating member 102 is a drive shaft 200 and the rotating device 118 is a drive train 202 that is used to transmit power from an engine (not shown) to wheels of a vehicle (not shown).

The drive train 202 includes a transmission 204 connected to the drive shaft 200 by a coupling mechanism 206. The coupling mechanism 206 is illustrated in this embodiment as a universal joint 206. However, the coupling mechanism 206 may include other appropriate joints or couplers that connect rigid shafts whose axes are inclined to each other. For example, the coupling mechanism 206 may include a constant velocity joint.

The drive shaft 200 in this embodiment includes a hollow portion 104 that extends for at least part of the length of the drive shaft 200. The hollow portion 104 may be formed into the drive shaft 200 by a drilling process, for example. Alternatively the drive shaft 200 may have a tubular shape and the hollow portion 104 may be the interior of the tube.

The balancing system 100 includes a vessel 108 inserted into the hollow portion 104 of the drive shaft 200, wherein an axis of rotation 106 passes through the vessel 108. A plurality of solid balancing beads 114 partially fills the vessel 108. When the drive shaft 200 is rotated, the balancing beads 114 are centrifugally positioned within the vessel 108 to compensate for imbalance in the drive shaft 200.

The universal joint 206, in this embodiment, includes a first yoke 207 and a second yoke 208 (i.e., a clamp or similar piece that embraces two other parts to hold or unite them in their respective or relative positions) coupled together. More specifically, the first yoke 207 of the universal joint 206 is a slip yoke 207. Also more specifically, the second yoke 208 of the universal joint 206 is a weld yoke 208. The slip yoke 207 is pressed into, in this case, the transmission 204 and the weld yoke 208 is pressed onto the drive shaft 200.

The weld yoke 208 and vessel 108 are illustrated in this embodiment as to separate components. However, the vessel 108 and weld yoke 208 may be integrally connected (for example by welding or bolting them together). Accordingly, the balancing system 100 would include the vessel 108 and a yoke 208 such that when the yoke 208 is pressed onto the drive shaft 200, the vessel 108 is simultaneously inserted into the hollow portion 104 of the drive shaft 200.

Figures 4A, 4B:
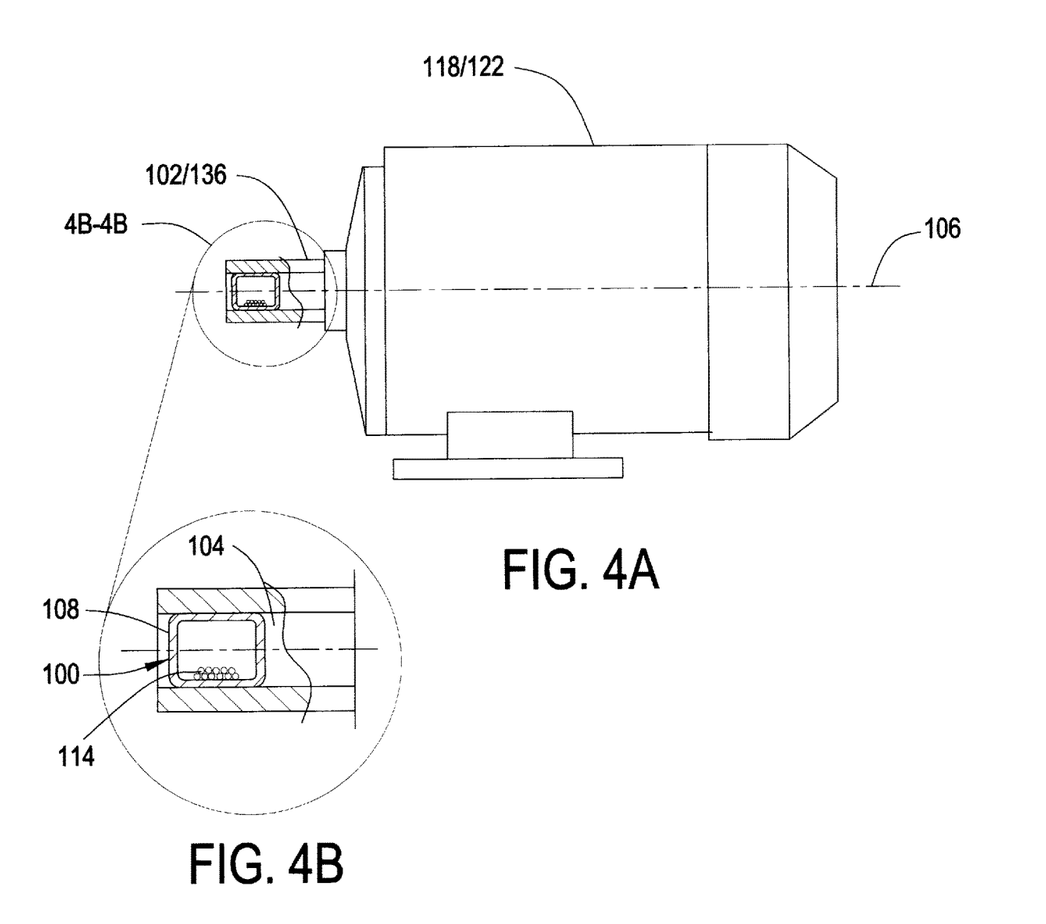
FIG. 4A is an exemplary embodiment of a cross sectional side view of a balancing system disposed in a hollow portion of a motor shaft for a motor in accordance with aspects described herein.
FIG. 4B is an exemplary embodiment of an enlarged cross sectional side view of the circular area 4B-4B in FIG. 4A in accordance with aspects herein.

Referring to FIGS. 4A and 4B, wherein FIG. 4A is another exemplary embodiment of a cross sectional side view of balancing system 100 disposed in a rotating member 102 of a rotating device 118 and FIG. 4B is an exemplary embodiment of an enlarged cross sectional view of the circular area 4B-4B in FIG. 4A. More specifically, in this embodiment, the rotating member 102 is a motor shaft 136 and the rotating device 118 is a motor 122.

The motor shaft 136 in this embodiment includes a hollow portion 104 that extends for at least part of the length of the motor shaft 136. The hollow portion 104 may be formed into the motor shaft 136 by a drilling process, for example.

The balancing system 100 includes a vessel 108 inserted into the hollow portion 104 of the motor shaft 136, wherein an axis of rotation 106 passes through the vessel 108. A plurality of solid balancing beads 114 partially fills the vessel 108. When the motor shaft 136 is rotated, the balancing beads 114 are centrifugally positioned within the vessel 108 to compensate for imbalance in the motor shaft 136.

Referring to FIGS. 5A and 5B, wherein FIG. 5A is another exemplary embodiment of a cross sectional side view of balancing system 100 disposed in a rotating member 102 of a rotating device 118 and FIG. 5B is an exemplary embodiment of an enlarged cross sectional view of the circular area 5B-5B in FIG. 5A. More specifically, in this embodiment, the rotating member 102 is an engine crankshaft 138 and the rotating device 118 is an internal combustion engine 124.

The engine crankshaft 138 in this embodiment includes a hollow portion 104 that extends for at least part of the length of the engine crankshaft 138. The hollow portion 104 may be formed into the engine crankshaft 138 by a drilling process, for example.

The balancing system 100 includes a vessel 108 inserted into the hollow portion 104 of the engine crankshaft 138, wherein an axis of rotation 106 passes through the vessel 108. A plurality of solid balancing beads 114 partially fills the vessel 108. When the engine crankshaft 138 is rotated, the balancing beads 114 are centrifugally positioned within the vessel 108 to compensate for imbalance in the engine crankshaft 138.

Referring to FIG. 6, another exemplary embodiment of a cross sectional side view of balancing system 100 disposed in a rotating member 102 of a rotating device 118 is presented. More specifically, in this embodiment, the rotating member 102 is a pump shaft 140 and the rotating device 118 is a pump 126.

Even more specifically, the pump 126 is a hydraulic pump 126 for a well bore drilling assembly and the pump shaft 140 is the pump output shaft 140 of the hydraulic pump 126. The output shaft 140 is rigidly connected to a drill bit 142. The hydraulic pump 126 is powered by a hydraulic drive mechanism (not shown) to rotate the drill bit 142 (as indicated by directional rotation arrow 141) and drill the well bore 144.

Often times during well bore drilling operations, mud, rocks or other foreign objects 143 can adhere to the drill bit 142 and cause an imbalance in the output shaft 140. The imbalance can create an undesirable torque on the drive mechanism and/or hydraulic pump, which may stall the drilling operation or cause the well bore to slant away from vertical. Further, as the solid objects attach and fall off of the drill bit during operation, the amount of imbalance will vary during the drilling process. Moreover, the deeper the well being drilled, the more the issue of varying imbalance is exacerbated.

The pump shaft 140 in this embodiment includes a hollow portion 104 that extends for at least part of the length of the pump shaft 140. The hollow portion 104 may be formed into the pump shaft 140 by a drilling process, for example.

The balancing system 100 includes a vessel 108 inserted into the hollow portion 104 of the pump shaft 140, wherein an axis of rotation 106 passes through the vessel 108. A plurality of solid balancing beads 114 partially fills the vessel 108. When the pump shaft 140 is rotated, the balancing beads 114 are centrifugally positioned within the vessel 108 to compensate for imbalance in the pump shaft 140.

The balancing system 100 inserted into a pump output shaft 140 of a well bore drilling operation may be useful in offsetting any imbalance caused by solid objects adhering to the drill bit during operation. Additionally, the balancing system 100 may be particularly useful in dynamically adjusting for changes in imbalance caused by various solid objects falling off of, and adhering to, the drill bit during a drilling operation.

Figure 7A:
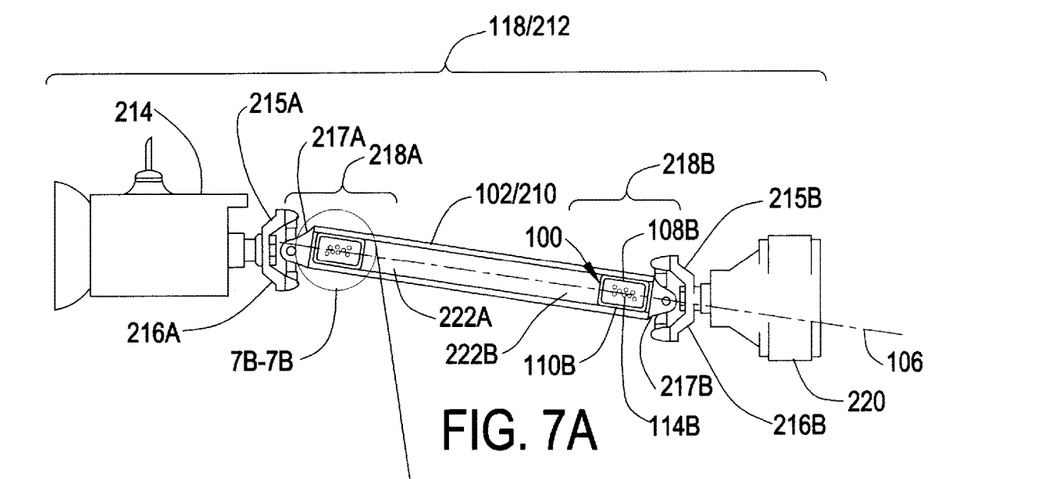
FIG. 7A is an exemplary embodiment of a cross sectional side view of a balancing system disposed in hollow opposing distal end portions of a drive shaft for a drive train in accordance with aspects described herein.
Figure 7B:
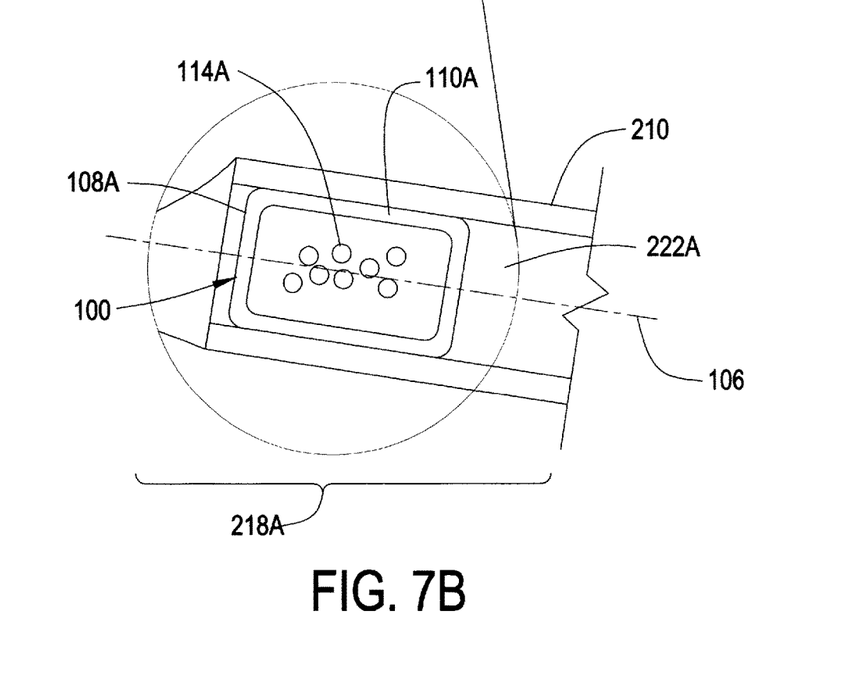
FIG. 7B is an exemplary embodiment of an enlarged cross sectional view of the circular area 7B-7B in FIG. 7A in accordance with aspects herein.
Figure 8:
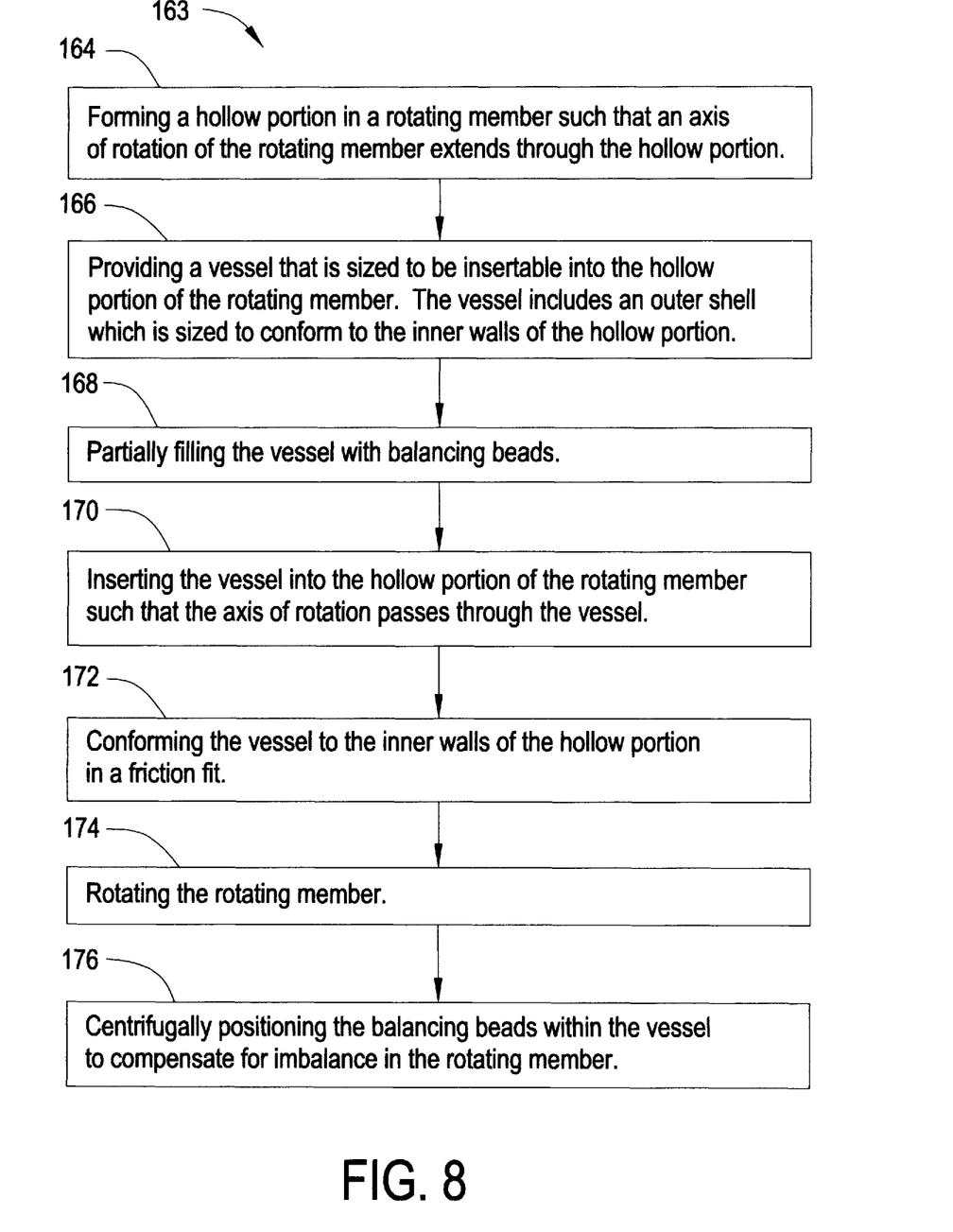
FIG. 8 is an exemplary embodiment of a flow diagram of a method of making a balancing system in accordance with aspects described herein.

Referring to FIGS. 7A and 7B, wherein FIG. 7A is another exemplary embodiment of a cross sectional side view of balancing system 100 disposed in a rotating member 102 of a rotating device 118 and FIG. 7B is an exemplary embodiment of an enlarged cross sectional view of the circular area 7B-7B in FIG. 7A. More specifically, in this embodiment, the rotating member 102 is a drive shaft 210 and the rotating device 118 is a drive train 212.

The drive train 212 in this embodiment includes a transmission 214 connected to the drive shaft 210 by a coupling mechanism 216A on one end portion 218A of the drive shaft 210. Additionally, the drive train 212 includes a differential 220 connected to the drive shaft 210 by a coupling mechanism 216B on an opposing end portion 218B of the drive shaft 210. The coupling mechanisms 216A, 216B are illustrated in this embodiment as universal joints. However, the coupling mechanisms 216A, 216B may include other appropriate joints or couplers that connect rigid shafts whose axes are inclined to each other.

In this embodiment, a pair of hollow portions 222A and 222B are disposed in the opposing end portions 218A and 218B of the drive shaft 210 such that an axis of rotation 106 extends through the hollow portions 222A and 222B. As illustrated in this embodiment, the pair of hollow portions 222A and 222B extends through the entire length of the drive shaft 210. However in other embodiments, the pair of hollow portions 222A and 222B may only extend partially through the length of the drive shaft 210.

The balancing system 100 in this embodiment includes a pair of vessels 108A, 108B, which are inserted into each hollow portion of the pair of hollow portions 222A, 222B. Each vessel of the pair of vessels 108A, 108B includes an outer shell 110A, 110B, which is shaped to conform to inner walls of the hollow portion 222A, 222B it is inserted into. The balancing system 100 also includes a plurality of solid balancing beads 114A, 114B partially filling each vessel 108A, 108B. When a vessel of the pair of vessels 108A, 108B is inserted each hollow portion of the pair of hollow portions 222A, 222B and the shaft 210 is rotating, the axis of rotation 106 passes through each vessel 108A, 108B and the balancing beads 114A, 114B are centrifugally positioned within each vessel 108A, 108B to compensate for imbalance in the drive shaft 210.

The embodiment of balancing system 100 illustrated in FIG. 9A shows paired vessels 108A, 108B being inserted into a rotating member 102. The rotating member 102 is specifically a drive shaft 210, wherein the drive shaft 210 is included in a rotating device 118 that is a drive train 212. However the balancing system 100, with paired vessels 108A, 108B, may be used for other applications as well. For example, the paired vessels 108A, 108B may be inserted into a double ended motor shaft of an electric motor, a doubled ended crankshaft of an engine or a double ended pump shaft of a pump.

The universal joints 216A and 216B, in this embodiment, each include a first yoke 215A, 215B respectively coupled to a second yoke 217A, 217B. More specifically, the first yokes 215A, 215B of each respective universal joint 216A, 216B are slip yokes 215A, 215B. Also more specifically, the second yokes 217A, 217B of each respective universal joint 216A, 216B are weld yokes 217A, 217B.

The slip yoke 215A, of universal joint 216A, is pressed into transmission 214 and the weld yoke 217A is pressed onto the drive shaft 210 to couple the transmission 214 and drive shaft 210 together. Additionally, the slip yoke 215B, of universal joint 216B, is pressed into differential 220 and the weld yoke 217B is pressed onto the drive shaft 210 to couple the differential 220 and drive shaft 210 together.

The weld yokes 217A, 217B and vessels 108A and 108B are illustrated in this embodiment as to separate components. However, the vessels 108A, 108B and weld yokes 217A, 217B may be integrally connected (for example by welding or bolting them together). Accordingly, the balancing system 100 would include the vessel 108A integrally connected to the yoke 217A and would further include the vessel 108B integrally connected to the yoke 217B. As such, when the yokes 217A and 217B are pressed onto the drive shaft 200, the vessels 108A and 108B are simultaneously inserted into the hollow portions 222A, 222B of the drive shaft 200.

Referring to FIG. 8, an exemplary embodiment of a flow diagram 163 of a method of making a balancing system 100 is presented. The method utilizes a modular vessel 108 containing balancing beads 114 to offset vibrations in a rotating member 102 of a rotating device 118 due to imbalance in the rotating device 118. The balancing system 100 may also dynamically adjust for changes in the imbalance in the rotating device 118. The imbalance may be caused by wear on the rotating device 118 or foreign objects that adhere to, or fall off of, the rotating device 118 during operation.

The method includes forming (164) a hollow portion 104 in a rotating member 102 of a rotating device 118, such that an axis of rotation 106 of the rotating member 102 extends through the hollow portion 104. The forming may be done by a drilling process, casting process or other suitable manufacturing process.

The forming (164) of the hollow portion 104 may include a pair of hollow portions (such as 222A and 222B in FIG. 7A) in the rotating member 102 disposed on opposing ends of the rotating member 102. In that case, the axis of rotation 106 may extend through each hollow portion 222A, 222B.

The method proceeds to providing (166) a vessel 108 that is sized to be insertable into the hollow portion 104 of the rotating member 102. The vessel includes an outer shell 110, which is sized to conform to inner walls 112 of the hollow portion 104. The outer shell 110, may be composed of a deformable material such as a plastic, an elastomer, a malleable metal or other suitable material. Alternatively, the outer shell 110 may be composed of a rigid material, such as steel.

The providing (166) of a vessel 108 may include providing a pair of vessels (such as vessels 108A and 108B of FIG. 7A). The pair of vessels 108A, 108B may be sized to be inserted into each hollow portion of a pair of hollow portions (such as 222A and 222B of FIG. 7A).

The method proceeds to partially filling (168) the vessel 108 with balancing beads 114. The balancing beads may be made from a suitable material that does not wear appreciably with use. For example, the balancing beads may be made from a metal or a ceramic. The vessel 108 is partially filled such that the balancing beads 114 are substantially free to move under the influence of centrifugal force applied by the rotating member 102. The centrifugal force will tend to distribute the beads 114 such that their mass will tend to offset any shifts (imbalance) in the center of mass of the rotating device caused by, for example, wear on the rotating device or foreign objects adhering to the rotating device. The distribution of the beads 114 will tend to realign the center of mass with the axis of rotation 106 of the rotating member 102, and therefore, reduce undesirable vibrations caused by such imbalance.

The method proceeds to inserting (170) the vessel 108 into the hollow portion 104 of the rotating member 102 such that the axis of rotation 106 passes through the vessel 108. If the balancing system 100 includes a pair of vessels 108A, 108B, then the axis of rotation 106 may pass through both vessels 108A, 108B.

The method proceeds to conforming (172) the vessel 108 to the inner walls 112 of the hollow portion 104 in a friction fit. That is, the outer shell 110 of the vessel 108 abuts against the inner walls 112 of the hollow portion 104 such that the rotating member 102 and balancing system 100 rotate together.

The method proceeds to rotating (174) the rotating member 102. The rotating member 102 may be rotated by a rotating device 118. The rotating member 102 may include one of a motor shaft 136, a pump shaft 140, an engine crankshaft 138, and a drive shaft 200, 210. The rotating device 118 may include one of a motor 122, a pump 126, an engine 124, and a drive train 202, 212.

The method proceeds to centrifugally positioning (176) the balancing beads 114 within the vessel 108 to compensate for imbalance in the rotating member 102. Centrifugal force applied by the rotating member 102 on the balancing beads 114 will tend to distribute the beads 114 such that their mass will tend to offset any shifts (imbalance) in the center of mass of the rotating device 118 caused by, for example, wear on the rotating device 118 or foreign objects adhering to the rotating device 118. The distribution of the beads 114 will tend to realign the center of mass with the axis of rotation 106 of the rotating member 102, and therefore, reduce undesirable vibrations caused by such imbalance.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A balancing system for a rotating member, the rotating member including a hollow portion and an axis of rotation which extends through the hollow portion, the balancing system comprising:
   a vessel insertable into the hollow portion of the rotating member, the vessel including an outer shell which is shaped to conform to inner walls of the hollow portion; and
   a plurality of solid balancing beads partially filling the vessel;
   wherein, when the vessel is inserted into the hollow portion and the rotating member is rotating, the axis of rotation passes through the vessel and the balancing beads are centrifugally positioned within the vessel to compensate for imbalance in the rotating member.

2. The balancing system of claim 1 wherein the vessel includes one of a substantially spherical shape and a substantially cylindrical shape prior to being inserted into the hollow portion of the rotating member.

3. The balancing system of claim 1 wherein the outer shell of the vessel comprises of one of a plastic and an elastomer.

4. The balancing system of claim 3 wherein the outer shell of the vessel comprises a rubber.

5. The balancing system of claim 1 wherein the outer shell of the vessel comprises a malleable metal.

6. The balancing system of claim 5 wherein the outer shell of the vessel comprises one of lead, tin and aluminum.

7. The balancing system of claim 1 wherein the balancing beads are comprised of a ceramic.

8. The balancing system of claim 1 wherein the rotating member comprises a rotating shaft of a rotating device.

9. The balancing system of claim 8 wherein:
   the rotating shaft comprises one of a motor shaft, a pump shaft, an engine crankshaft and a drive shaft; and
   the rotating device comprises one of a motor, a pump, an engine and a drive train.

10. The balancing system of claim 1 wherein the hollow portion is concentrically disposed around the axis of rotation.

11. The balancing system of claim 1, wherein the hollow portion comprises a pair of hollow portions disposed in opposing end portions of the rotating member, the balancing system comprising:
    the vessel comprising a pair of vessels, each vessel being insertable into a hollow portion of the pair of hollow portions.

12. The balancing system of claim 1 wherein the vessel is sized to be a friction fit into the hollow portion.

13. The balancing system of claim 1 wherein the vessel is integrally connected to a yoke.

14. A shaft balancing system for a rotating shaft of a rotating device, the shaft having a pair of hollow portions disposed in opposing end portions of the shaft and an axis of rotation which extends through the hollow portions, the balancing system comprising:
    a pair of vessels insertable into a hollow portion of the pair of hollow portions, each vessel of the pair of vessels including an outer shell which is shaped to conform to inner walls of the hollow portion it is inserted into; and
    a plurality of solid balancing beads partially filling each vessel;
    wherein, when a vessel of the pair of vessels is inserted into each hollow portion of the pair of hollow portions and the shaft is rotating, the axis of rotation passes through each vessel and the balancing beads are centrifugally positioned within each vessel to compensate for imbalance in the shaft.

15. The balancing system of claim 14 wherein:
the outer shell of each vessel comprises one of a plastic, an elastomer and a malleable metal; and
the beads comprise a ceramic.

16. The balancing system of claim 14 wherein:
the rotating shaft comprises one of a motor shaft, a pump shaft, an engine crankshaft and a drive shaft; and
the rotating device comprises one of a motor, a pump, an engine and a drive train.

17. The balancing system of claim 14 wherein each vessel of the pair of vessels is integrally connected to a yoke.

18. A method of balancing a rotating member of a rotating device, the method comprising:
forming a hollow portion in the rotating member such that an axis of rotation of the rotating member extends through the hollow portion;
providing a vessel that is sized to be insertable into the hollow portion of the rotating member, the vessel including an outer shell which is shaped to conform to inner walls of the hollow portion;
partially filling the vessel with balancing beads;
inserting the vessel into the hollow portion of the rotating member such that the axis of rotation passes through the vessel;
conforming the vessel to the inner walls of the hollow portion in a friction fit;
rotating the rotating member; and
centrifugally positioning the balancing beads within the vessel to compensate for imbalance in the rotating member.

19. The method of claim 18 comprising:
forming a pair of hollow portions in the rotating member disposed on opposing ends of the rotating member and having the axis of rotation extend through each hollow portion;
providing a pair of vessels that are sized to be inserted into a hollow portion of the pair of hollow portions.

20. The method of claim 19 wherein:
the rotating member comprises one of a motor shaft, a pump shaft, an engine crankshaft and a drive shaft; and
the rotating device comprises one of a motor, a pump, an engine and a drive train.

* * * * *

UNITED STATES PATENT AND TRADEMARK OFFICE
CERTIFICATE OF CORRECTION

PATENT NO. : 10,823,255 B2
APPLICATION NO. : 15/937490
DATED : November 3, 2020
INVENTOR(S) : Daniel Cadalso It is certified that error appears in the above-identified patent and that said Letters Patent is hereby corrected as shown below:

In the Claims

Column 10, Line 2: Claim 1, Delete "member, the" and insert -- member of a rotating device, the --

Column 10, Line 8: Claim 1, Delete "portion; and" and insert -- portion, the vessel also including a hollow interior enclosed by the outer shell; and --

Column 10, Line 10: Claim 1, Delete "filling the vessel;" and insert -- filling the hollow interior of the vessel; --

Column 10, Line 14: Claim 1, Delete "the vessel" and insert -- the hollow interior of the vessel --

Column 10, Line 15: Claim 1, Delete "within the" and insert -- within hollow interior of the --

Column 10, Line 16: Claim 1, Delete "member." and insert -- member, and wherein when the rotating member is stationary, the balancing beads are free to move in the hollow interior of the vessel. --

Column 10, Line 62: Claim 14, Delete "into; and" and insert -- into, each vessel also including a hollow interior enclosed by the outer shell; and --

Column 11, Line 1: Claim 14, Delete "through each" and insert -- through the hollow interior of each --

Column 11, Line 2: Claim 14, Delete "within each" and insert -- within the hollow interior of each --

Column 11, Line 3: Claim 14, Delete "shaft." and insert -- shaft, and wherein when the shaft is stationary, the balancing beads are free to move in the hollow interior of each vessel. --

Column 11, Line 23: Claim 18, Delete "portion;" and insert -- portion, the vessel also including a hollow interior enclosed by the outer shell; --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,823,255 B2

Column 12, Line 1: Claim 18, Delete "filling the" and insert -- filling the hollow interior of the --

Column 12, Line 4: Claim 18, Delete "the vessel;" and insert -- the hollow interior of the vessel; --

Column 12, Lines 6-7: Claim 18, Delete "in a friction fit; rotating the rotating member; and"

Column 12, Line 8: Claim 18, Delete "within the" and insert -- within the hollow interior of the --

Column 12, Line 10: Claim 18, Delete "member." and insert -- member, when the rotating member is rotating; and allowing the balancing beads free movement within the hollow interior of the vessel when the rotating member is stationary. --